(12) United States Patent
Cheng

(10) Patent No.: US 6,370,862 B1
(45) Date of Patent: Apr. 16, 2002

(54) STEAM INJECTION NOZZLE DESIGN OF GAS TURBINE COMBUSTION LINERS FOR ENHANCING POWER OUTPUT AND EFFICIENCY

(75) Inventor: Dah Yu Cheng, Los Altos Hills, CA (US)

(73) Assignee: Cheng Power Systems, Inc., Mountain View, CA (US)

( * ) Notice: Subject to any disclaimer, the term of this patent is extended or adjusted under 35 U.S.C. 154(b) by 0 days.

(21) Appl. No.: 09/637,555

(22) Filed: Aug. 11, 2000

(51) Int. Cl.$^7$ ................................................ F02G 3/00
(52) U.S. Cl. ...................... 60/39.05; 60/39.55
(58) Field of Search ............................. 60/39.05, 39.55

(56) References Cited

U.S. PATENT DOCUMENTS 3,747,336 A * 7/1973 Dibelius et al. ........... 60/39.55
5,199,255 A * 4/1993 Sun et al. .................. 60/39.02

* cited by examiner

Primary Examiner—Charles G. Freay
(74) Attorney, Agent, or Firm—Cooper & Dunham LLP

(57) ABSTRACT

A steam injection nozzle system for injecting steam into a combustion liner of a gas turbine for enhancing power output and efficiency of the gas turbine. The combustion liner has a plurality of dilution holes for supplying air to a combustion chamber to create turbulence. A steam manifold surrounds the combustion liner and has a plurality of steam injection nozzles, each steam injection nozzle being disposed opposite a corresponding dilution hole, without touching the combustion liner, for injecting the steam directly into the combustion liner through the dilution holes. The steam is injected without altering an existing amount of air through the plurality of dilution holes, resulting in a constant amount of air through the plurality of dilution holes independent of the amount of steam injected therein within a predetermined range of steam. The predetermined range of steam injected may be between approximately 9% and approximately 35%, inclusive, of the air flowing through the combustion liner. Alternatively, the predetermined range of steam injected may be less than or equal to approximately 35% of the air flowing through the combustion liner.

22 Claims, 12 Drawing Sheets

Preliminary Results with Injected Steam
Variation of Mass Fraction of Injected Steam
Steam Flow Rate = 3.681 kg/s, Air = 25.127 kg/s, Fuel = 0.568 kg/s

STEAM INJECTION NOZZLE DESIGN OF GAS TURBINE COMBUSTION LINERS FOR ENHANCING POWER OUTPUT AND EFFICIENCY

FIELD

This patent specification relates to the field of gas turbine engines, and more particularly to a steam injection nozzle system for the combustion liner of a gas turbine engine for enhancing the power output and efficiency of the gas turbine engine.

BACKGROUND

A gas turbine engine is a heat engine that is operated by a gas rather than being operated, for instance, by steam or water. The two major application areas of gas turbine engines are aircraft propulsion and electric power generation. A detailed description of gas turbines is provided in William W. Bathie, *Fundamentals of Gas Turbines* (John Wiley & Sons, Inc. 1996), which is hereby incorporated by reference.

The burner section of a gas turbine includes a combustion chamber which is designed to burn a mixture of fuel and air and to deliver the resulting gases to the turbine at a temperature not exceeding the allowable limit at the turbine inlet. The burners, within a very limited space, must add sufficient heat energy to the gases passing through the engine to accelerate their mass enough to produce the desired thrust for the engine and power for the turbine.

Combustion chambers are lined with combustion liners. FIG. 1 illustrates a typical combustion liner. The holes supply primary, secondary, and cooling air for the gas turbine operations. As illustrated in FIG. 1, the fuel comes from one end of the combustion liner (in this case, from the left of the page) supplemented by a pre-mixed airflow. A plurality of jets, indicated by holes along the combustion liner, supply turbulence and a secondary air supply for the combustion regions. These jets are depicted by the holes of Sections 1, 2, and 3, which operate to satisfy various air requirements for achieving a quality combustion system.

Section 4 is usually a much larger area, with the air being supplied by higher-level jets to create turbulent mixing. In this process, the combustion flame products are mixed with the compressor air to reach a final homogeneous working fluid at designated operating turbine inlet temperatures (TIT). There are also many small cooling holes along the wall of the liner to keep the liner metal temperature down. The final flow of the combustion liner exhaust is directed into a transition piece which connects the air flow cross section of a typical combustion can (typically a cylinder-shaped burner) to a turbine nozzle bank segment. This design is typically used with all or nearly all modern, ground-based gas turbines.

Heavy duty gas turbines with long combustion liner designs frequently use reverse flow combustion liners to accommodate a long flame. Reverse flow combustion liners are used in other combustion liner variations as well. In general, to compensate for the length of the combustion liner, compressor discharge air ordinarily flows backwards into the envelope or combustion wrapper of the combustion cans, then reverses its direction, moving through the combustion liner and reaching a designated turbine inlet temperature at the first row of nozzles in the gas turbine. The gas turbine's performance is related to the turbine inlet temperature, and the first stage nozzle and blades have maximum metal temperature limitations. These temperature limitations are determined by the materials used. Even though today's turbines use single crystal metals, they must still employ various cooling means to keep the metal temperature down.

The combustion liner design has been carefully engineered over the years so that the flame can operate with a high ratio of turndowns to provide an efficient startup and to provide low load operating conditions. Using a diffusion flame, the fuel is mixed with an oxidizer before combustion. The oxidizer then diffuses to the flame envelope, allowing the oxidizer and the fuel to reach a stoicheometric ratio where the flame resides. A diffusion flame is the preferred method for increasing the diffusion rate of oxidants to the flame envelope. Because the flame always resides at the stoicheometric ratio surface, the gas turbine inlet temperature is controlled by running dilution air downstream along the length of the flame to reach an appropriate mixture and a designated homogenous design temperature for the gas turbine. The dilution holes are strategically located to provide an air jet which creates internal turbulence. Because this turbulence causes the pressure to drop, it also reduces the fluid working potential. The air jets must therefore attempt to provide turbulence at a level that will result in a minimal pressure drop across the combustion liner to avoid loss of the fluid working potential.

One area of gas turbine engines which needs improvement is the area of power output and efficiency. The Advanced Cheng Cycle, conceived by the Applicant of the present disclosure, is a massive steam-injected gas turbine that uses steam to augment its power output. Steam is injected into the gas turbine ahead of the first turbine nozzle bank just downstream of the combustion region. Steam injection has previously been employed as a power boost on some gas turbine engines. The injection, however, has been traditionally limited to about 5 to 9% of the air flow in order to avoid causing compressor stall and flame instability.

In previous systems, steam and air has been injected before the combustion liner; that is, steam was not injected directly into the combustion liner. The steam injection point has previously been the compressor exit plenum area. By this method, steam enters the combustor through all combustor liner admission areas: the primary zone, the dilution zone, and the cooling louvers. The combustor pressure drop increases with increased steam flow, depending on the steam-air ratio. Therefore, although the effect on combustion efficiency could be minimal, the additional mass going through the holes on the combustion can requires a higher pressure drop. Furthermore, steam carried in the air modifies the combustion of air by reducing the relative concentrations of both oxygen and nitrogen. Dilution of the oxygen in the composition lowers the combustion reaction rate.

Moreover, in recent years, air pollution has emerged as a major concern in the field of chemical engineering, and reducing air pollution is a secondary goal of the disclosure herein. The predominant emissions from gas turbines are the oxides of nitrogen, or $NO_x$, which are one of today's leading components of air pollution. The most prevalent $NO_x$ emissions are nitric oxide, NO, and nitrogen dioxide, $NO_2$. The diffusion flame temperature emanating from gas turbines produces these $NO_x$ emissions. If the flame front receives insufficient oxygen or turbulence, the resulting concentration of carbon monoxide can become an additional factor in highly polluted air.

In light of the air pollution problem, gas turbines now use a dry, low $NO_x$, combustion liner. This type of combustion liner maintains both a lower pressure level and a higher turbulence level than ordinary combustion liners in order to achieve the low flame temperature necessary to reduce $NO_x$ emissions.

The Advanced Cheng Cycle demonstrates that $NO_x$ emissions have decreased substantially from previous simple cycle combustion liner designs. However, the reverse flow combustion liner differs somewhat from the aeroderivative gas turbine design by allowing steam to easily mix with the compressor discharge before it enters the combustion liner.

Some of the current gas turbine manufacturers have injected steam concentric to the fuel nozzle as a means of lowering the $NO_x$ emissions. The optimum steam injection using that particular method reaches a limit of flame stability at a steam-to-fuel ratio of approximately 1:1. However, a problem with this amount of steam is injection into a combustion liner is that power augmentation suffers.

A secondary method of steam injection involves injecting the steam at the plenum chamber. Here, the steam will mix with the compressor air and the mixture will flow around the combustion liner, entering the combustion liner through the various dilution and cooling holes. However, there is a problem in that when the steam-to-air ratio reaches about 9%, the flame becomes unstable.

The system and method disclosed herein overcome the above-described difficulties.

SUMMARY

An object of this patent specification is to increase the power output and efficiency of gas turbine engines. A secondary goal is to reduce the level of $NO_x$ emissions emanating therefrom. Another object is to provide a system in which steam is injected in various amounts into existing dilution holes of the original combustion liner design without disturbing the air flow distribution thereof. The disclosure herein teaches to use steam pressure and its produced momentum to eject air through the original dilution holes. This both minimizes the pressure drop required to create turbulence and provides turbulence itself, using the momentum of the steam jet inside the combustion liner. Along with the increased turbulence inside the combustion liner, the flame temperature is reduced by adding the steam, which has a very high heat absorption capacity, to the existing mixture of oxygen and nitrogen (the major components of air). Because the steam enables the mixture to absorb the heat of combustion, the flame temperature is reduced. The turbulent mixing will also provide a sufficient supply of oxygen to potentially reduce the amount of carbon monoxide.

Injection of steam directly into the combustor liner through the dilution air holes as taught by the disclosure herein has the desirable feature that little or no steam is admitted directly to the primary combustion zone, the area very close to the fuel injection nozzles. This has the result that the reaction kinetics inside the combustion liner are unaffected by the steam injection.

Thus, an objective of the disclosure herein is to inject steam through a plurality of dilution holes, proportional to the total airflow, without altering the air distribution already designated for those dilution holes. Another objective is to reduce the pressure drop required to inject steam across a combustion chamber at the onset of the steam injection rate. A further objective is to increase the turbulence diffusion rate for combustion through the process of turbulent mixing, which sufficiently reduces both the flame temperature and the $NO_x$ emissions.

A further objective is to provide a consistent mixture of the main combustion products, the dilution cooling air, and the steam to create a steady or uniform temperature profile before the mixture enters the first nozzle of the gas turbine. By establishing a consistent temperature profile, the mixture can reduce the metal temperature of the hot streaks and hot spots in the first stage nozzle, prolonging its life and increasing its accurate function.

The disclosure herein therefore describes efficient methods of injecting steam into gas turbine combustion liners. The disclosure targets all combustion liner variations, and particularly relates to reverse flow combustion liners.

In summary, the disclosure herein in one embodiment provides a steam injection nozzle system for injecting steam into a combustion liner of a gas turbine for enhancing power output and efficiency of the gas turbine, the combustion liner having a plurality of dilution holes for supplying air to a combustion chamber to create turbulence, the steam injection nozzle system comprising: a steam manifold surrounding the combustion liner and having a plurality of steam injection nozzles, disposed opposite corresponding dilution holes, for injecting the steam directly into the combustion liner through the dilution holes, wherein the steam is injected without substantial alteration of an existing amount of air through the plurality of dilution holes, resulting in a constant amount of air through the plurality of dilution holes independent of the amount of steam injected therein within a predetermined range of steam.

The predetermined range of steam injected may be between approximately 9% and approximately 35% by weight, inclusive, of the air flowing through the combustion liner. Alternatively, the predetermined range of steam injected may be less than or equal to approximately 35% by weight of the air flowing through the combustion liner. The steam injection nozzle system is preferably designed such that each steam injection nozzle disposed opposite a corresponding dilution hole is not in contact with the combustion liner.

The relationship between the steam nozzle diameter design and the size of the dilution holes of the combustion liners will be discussed in detail below, along with the effect of this relationship on combustion and emissions of gas turbines.

DETAILED DESCRIPTION OF PREFERRED EMBODIMENTS

Figure 2:
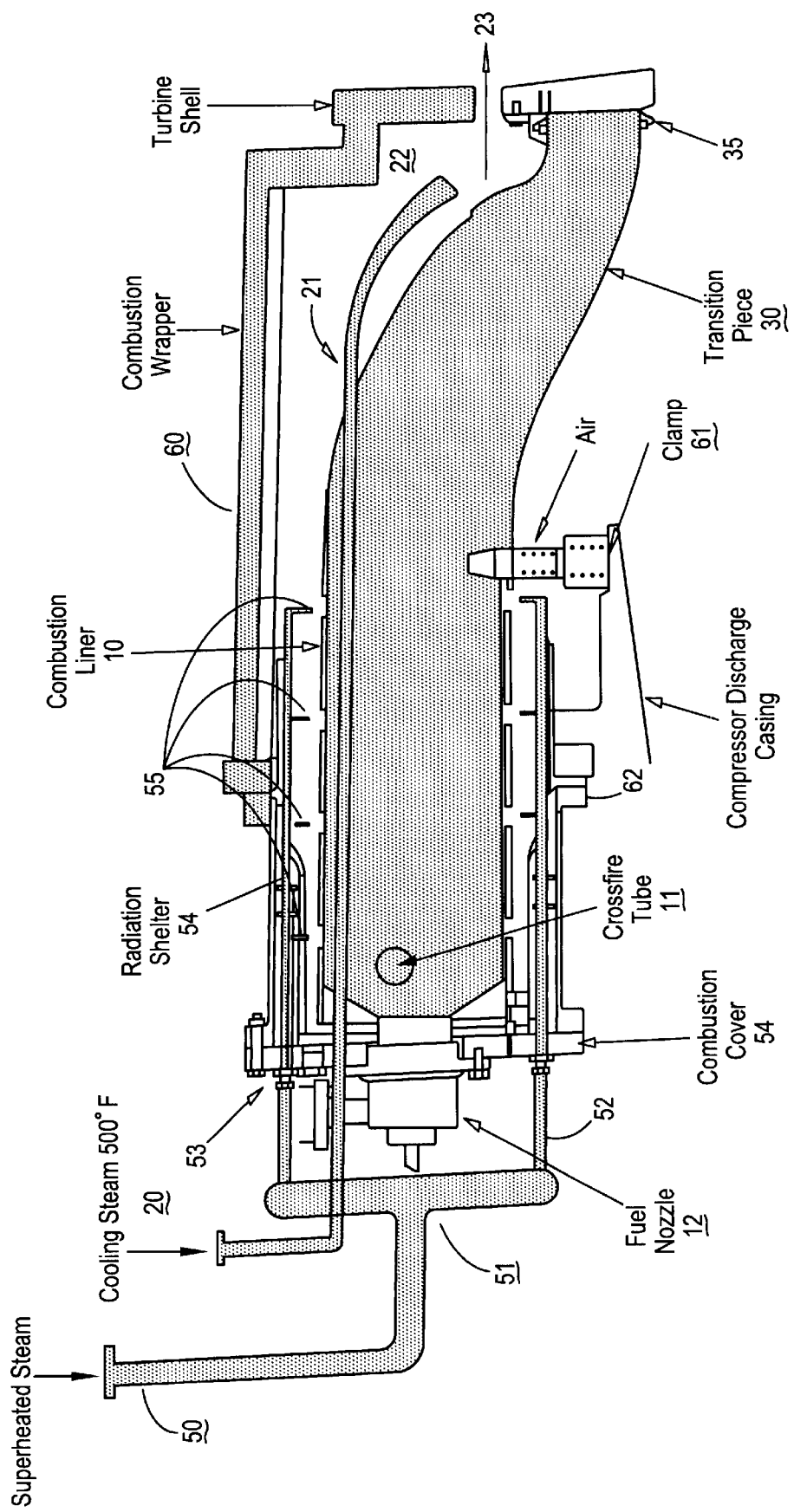
FIG. 2 illustrates a steam injection embodiment having a steam manifold carrying a plurality of steam jets directed toward the dilution holes of the combustion liner.

FIG. 2 illustrates a steam injection design having a steam manifold 51 carrying a plurality of steam jets 55 directed toward the dilution holes of a combustion liner. FIG. 2 depicts a GE Frame 5 or Frame 7 flue arrangement. Preferably, the injection holes do not touch the combustion liner 10 directly.

As illustrated in FIG. 2, compressed air is first channeled in the reverse direction toward the turbine. The compressed air then flows into an envelope 60 surrounding the combustion liner 10. The combustion liner 10 has a plurality of dilution holes and transpiration cooling holes. The dilution holes and cooling holes are equipped with a crossfire tube 11 which allows the flame to cross-ignite its neighboring chambers. The end of the combustion liner 10 also has a fuel nozzle 12, typically mounted on a back plate called a combustion cover 54. The envelope 60 of the combustion can, sometimes called a combustion wrapper, provides the mechanical alignment for the positioning of the combustion liner 10. The envelope 60 is bolted onto the bulkhead of the larger piece surrounding the combustion cans, where it is typically mounted before entering the gas turbine sections.

Steam provided from a waste heat recovery boiler flows through port 50 and along the steam manifold 51. The steam is distributed to four steam ejection pipes 52 through a fitting 53. The pipe 52 may carry single or multiple steam nozzles 55 pointing to the dilution holes of the combustion liner 10. The transition piece is depicted by reference numeral 30. Additional turbine blade cooling steam injectors 21 receive their cooling steam from the boiler 20, usually at 500° F. This steam mixes with the compressed air in region 22 and cools the compressed air before entering the coolant entrance of the first stage nozzle at position 23. Everything can be mounted on the turbine shell for mechanical alignment, and the combustion liner is adjusted by a clamp and line system 61. Spacers are mounted and aligned with the combustion wrapper to provide the necessary number of combustion cans required.

The relationship between the nozzle diameter design and the size of the dilution holes of the liners will be discussed in detail below, along with the effect of this relationship on combustion and the emissions of the gas turbines.

Figure 3A:
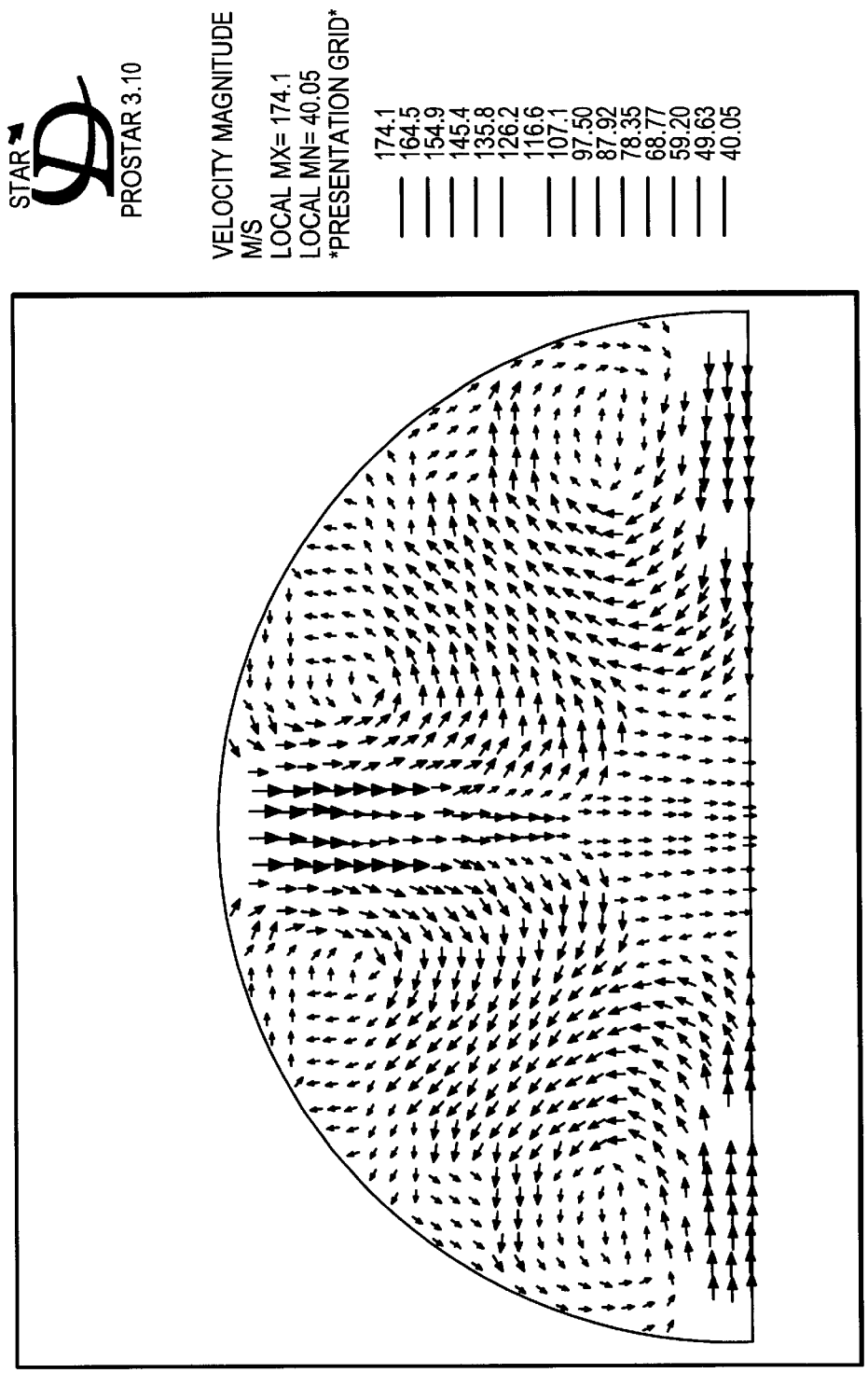
FIGS. 3a and 3b illustrate flow simulations by computation of fluid dynamics depicting a cross section of the combustion liner along the last large dilution holes with and without the steam injection.
Figure 3B:
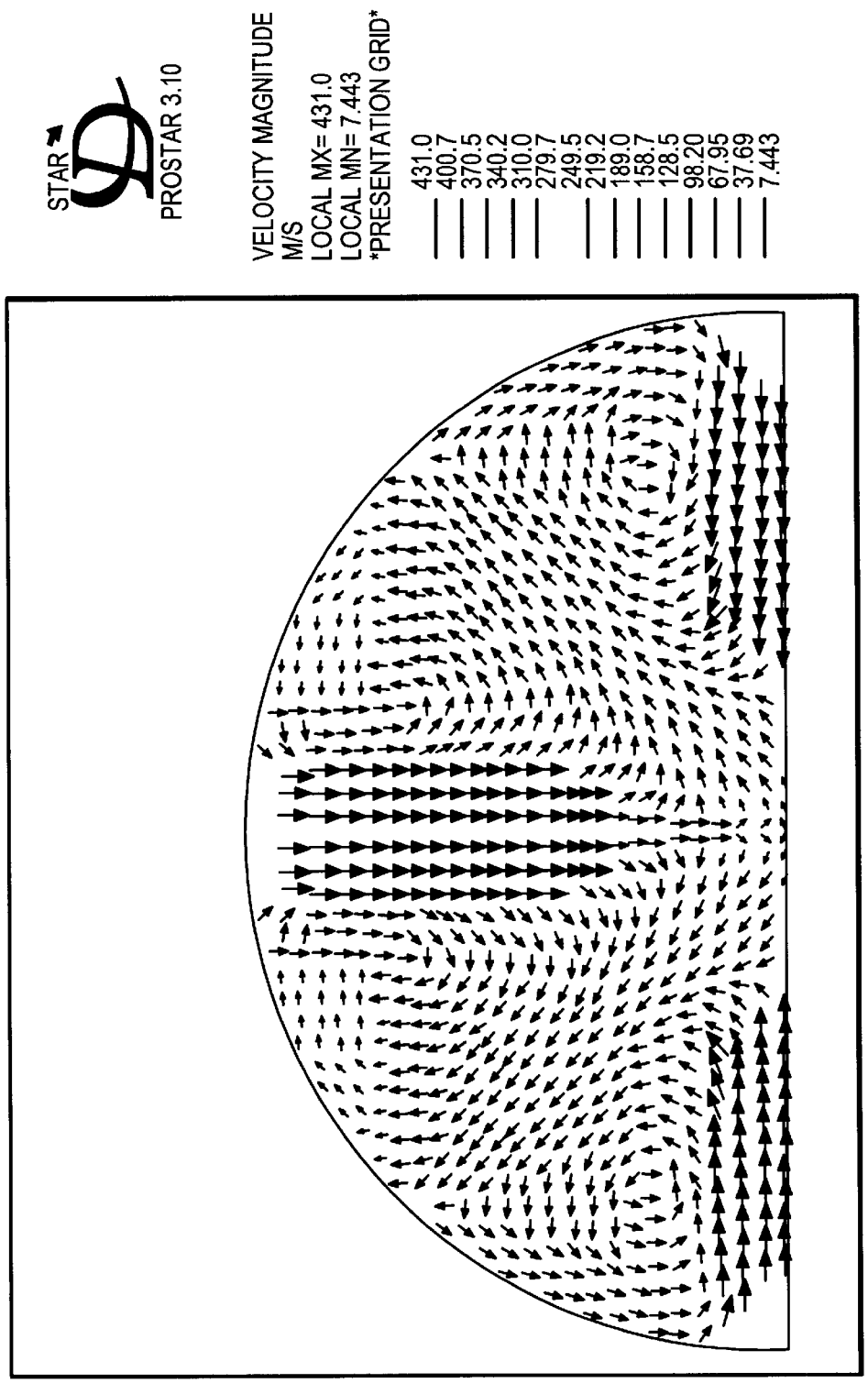

FIGS. 3a and 3b illustrate cross-sectional views of numerical flow simulations, using calculations of fluid dynamics to depict a cross section of the combustion liner along the last dilution holes. The two figures compare the velocity, both with and without steam as a variation of the turbulent intensity inside the combustion liner. FIG. 3a shows the comparison without the steam injection, while FIG. 3b shows the comparison with the steam injection in accordance with the teachings of the disclosure herein.

Figure 1:
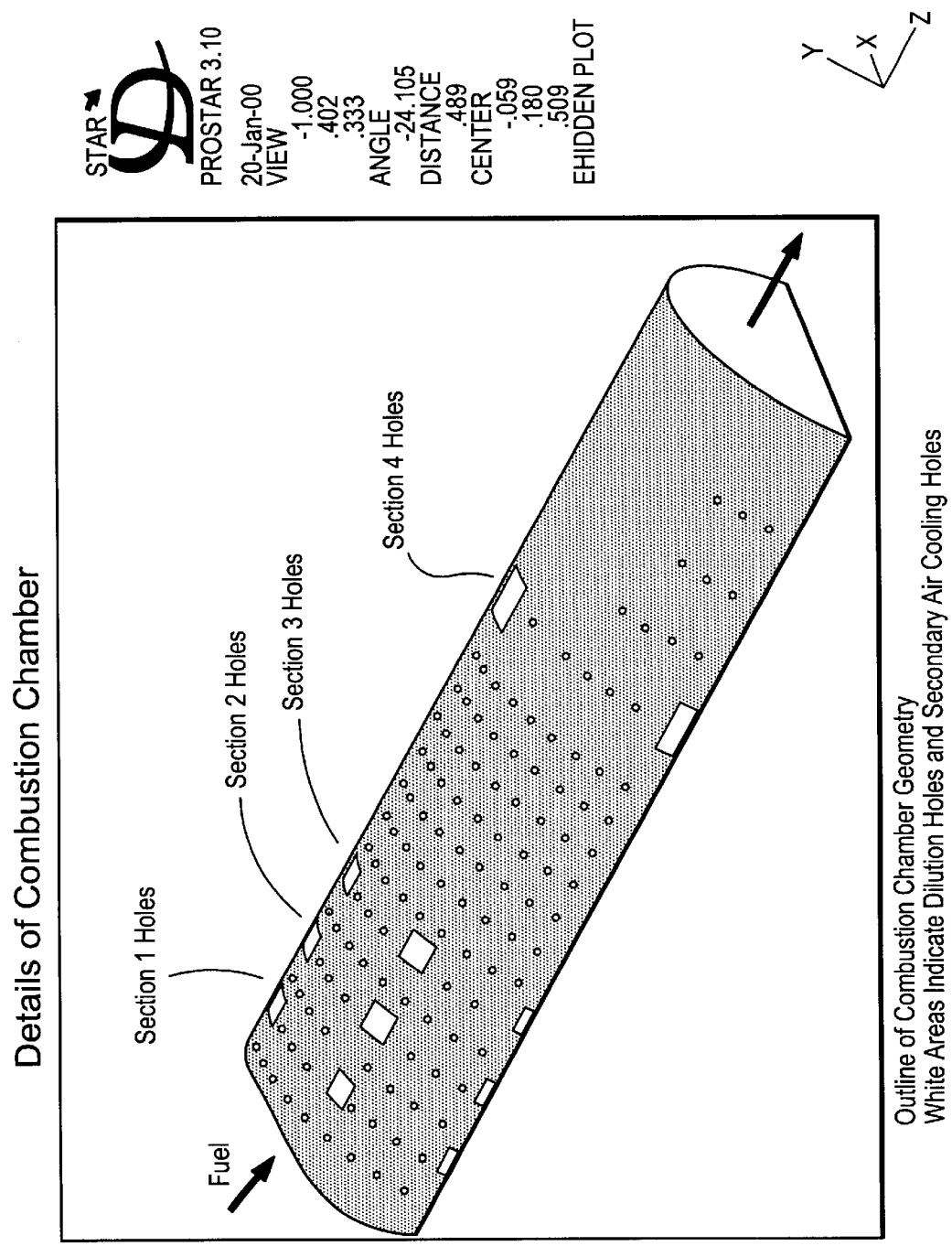
FIG. 1 illustrates a cutaway view of a typical combustion liner.

In more detail, FIG. 3a shows half of an intact combustion can under the dilution holes, with compressed air entering them. The combustion liner in this cross section does not use the steam injection method of the disclosure herein. Turbulence in this situation is generated only by air, and the pressure loss across the holes of the combustion liner usually remains in the range of 3–5% of the total compressed air. FIG. 3b, however, shows the combustion liner using the steam injection method of the disclosure herein to increase the turbulence level at Section 4 of FIG. 1. The higher level of turbulent flow demonstrates that the steam momentum and steam injection jets augment the effectiveness and performance of the combustion liner.

Figure 4A:
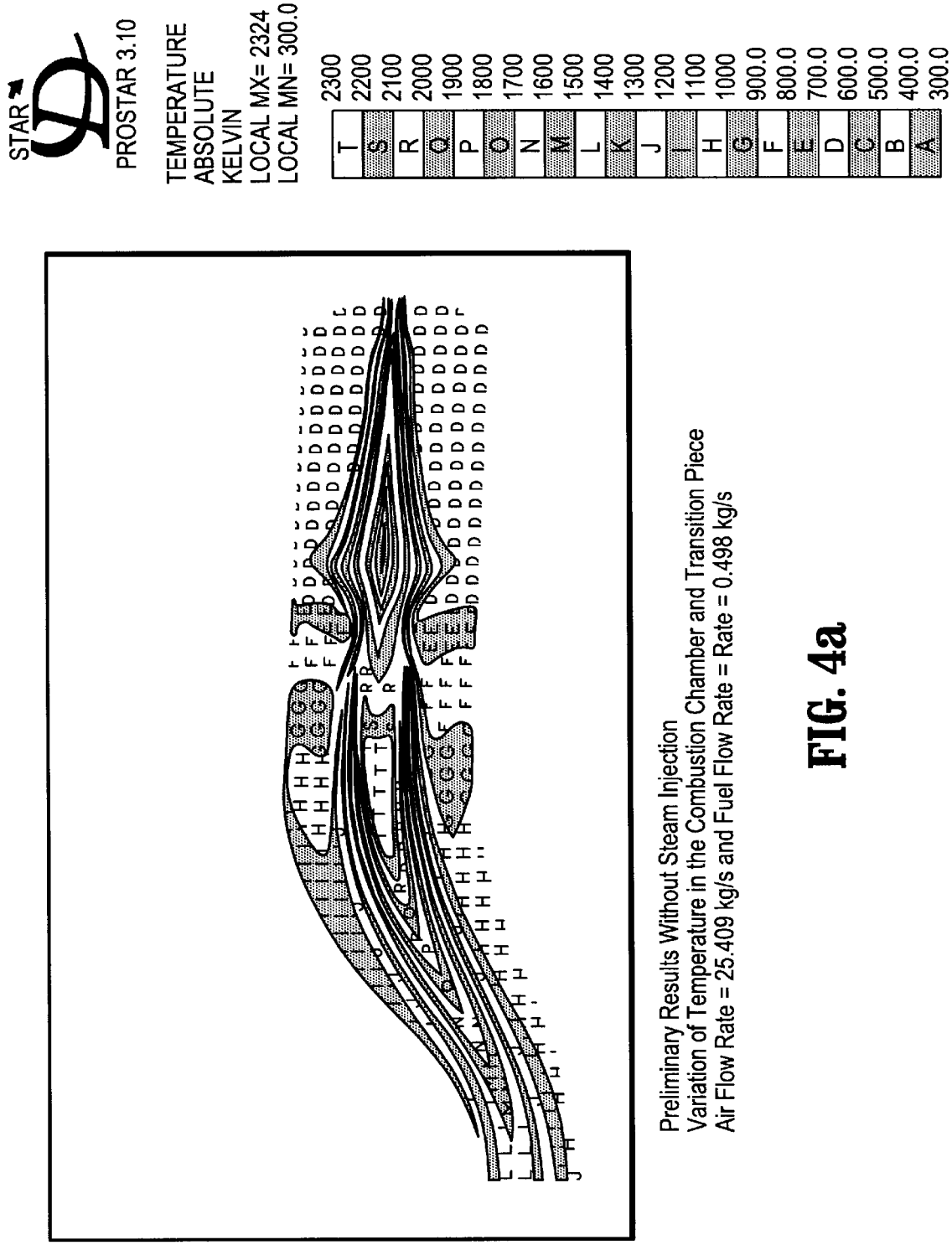
FIGS. 4a and 4b illustrate comparisons of the results of the temperature profile in the combustion liner with and without the steam injection.
Figure 4B:
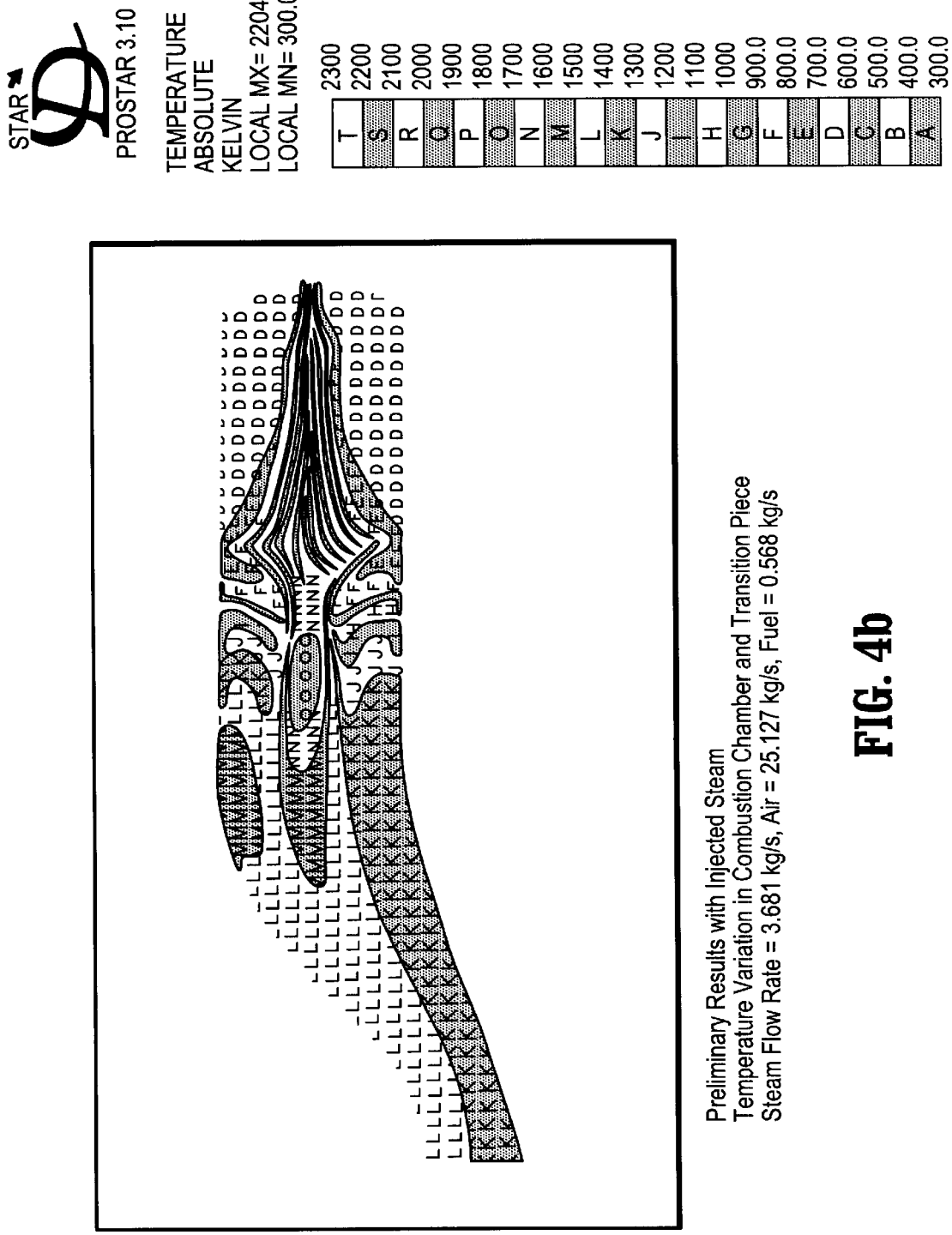

FIGS. 4a and 4b are computer-generated drawings illustrating operations of the combustion liner with combustion. The drawings profile the results of the dilution air mixing with the flame, illustrating the temperature contours and the mixture's movements through the transition piece before entering the nozzle of the first stage turbine system. FIG. 4a illustrates preliminary results of the temperature profile in the combustion liner without a steam injection, while FIG. 4b illustrates the same results with the steam injection as taught by the disclosure herein. FIG. 4b shows that the inflow moves at the Advanced Cheng Cycle flow rate for combustion chambers, going through the fourth dilution hole of Section 4 of a typical combustion liner. The temperature profile of FIG. 4b represents the results of steam-generated mixing. The turbulence in FIG. 4b, with steam injection, is more uniform before it enters the first stage nozzle than in FIG. 4a, without a steam injection.

Figure 5:
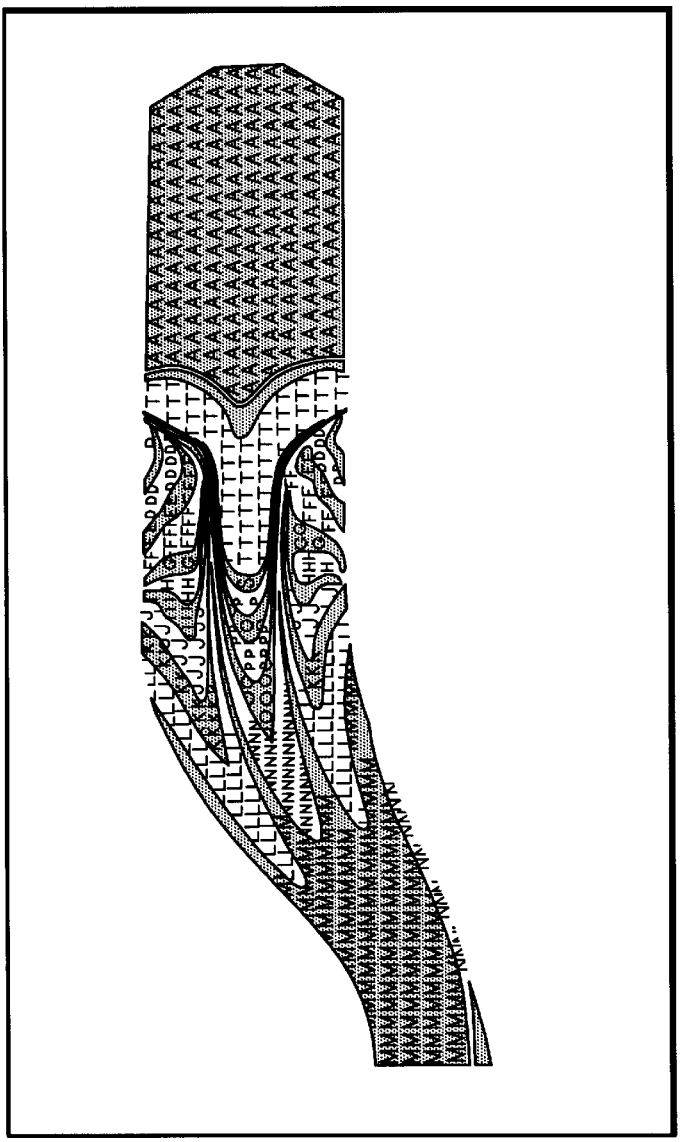
FIG. 5 illustrates a steam concentration profile with the steam injection.

FIG. 5 illustrates a computer simulation of the injected steam concentration while it mixes with the combustion products through the combustion liner and accelerates in the transition piece toward the first stage gas turbine nozzles. The concentration contour is shown on the scale on the right hand side. A striking feature of the steam concentration in FIG. 5 is its uniformity before it enters the first stage nozzles, which plays a key role in preserving the part life of the gas turbine and in improving its general performance.

Figure 6:
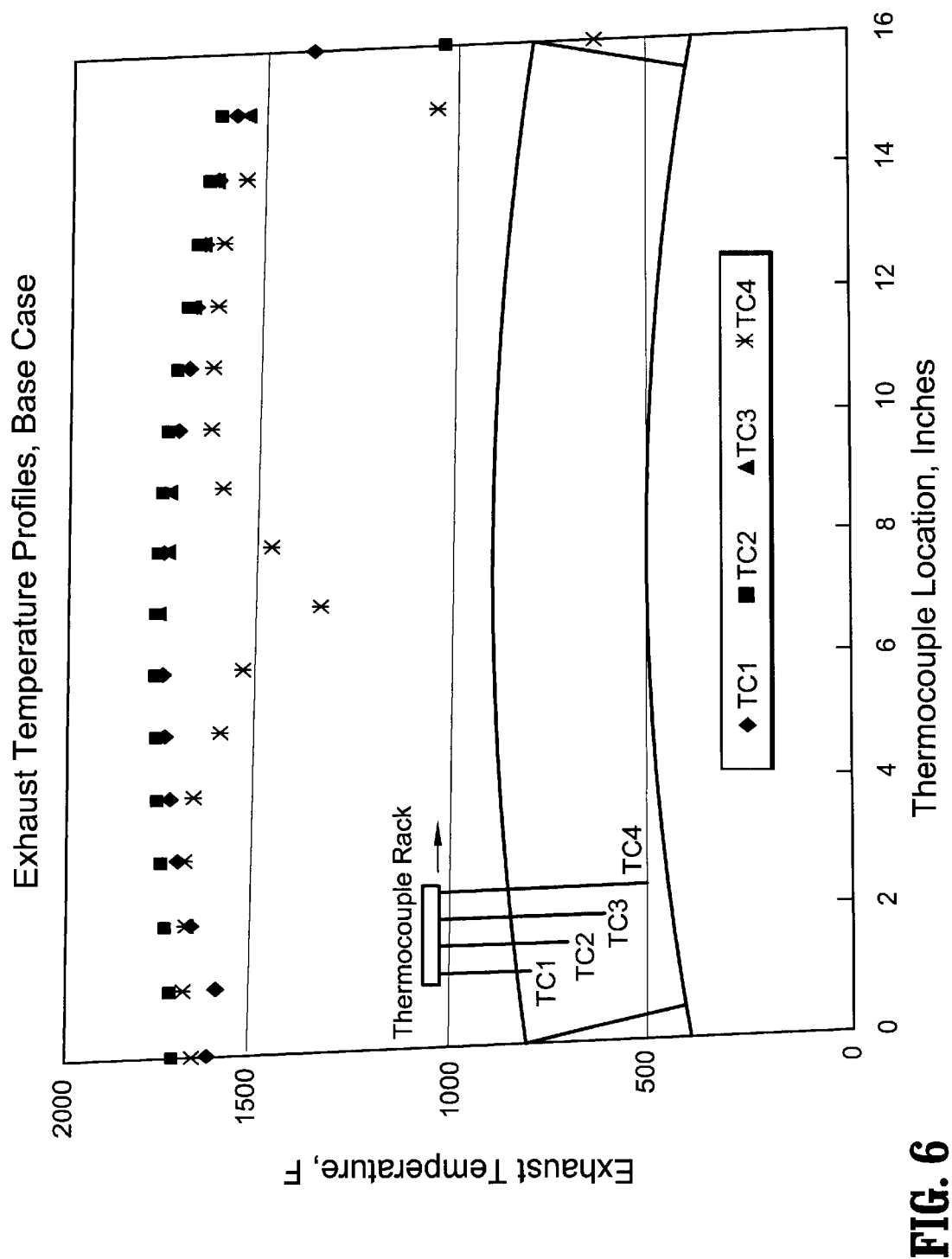
FIG. 6 illustrates an example of the temperature profile of exhaust without a steam injection.
Figure 7:
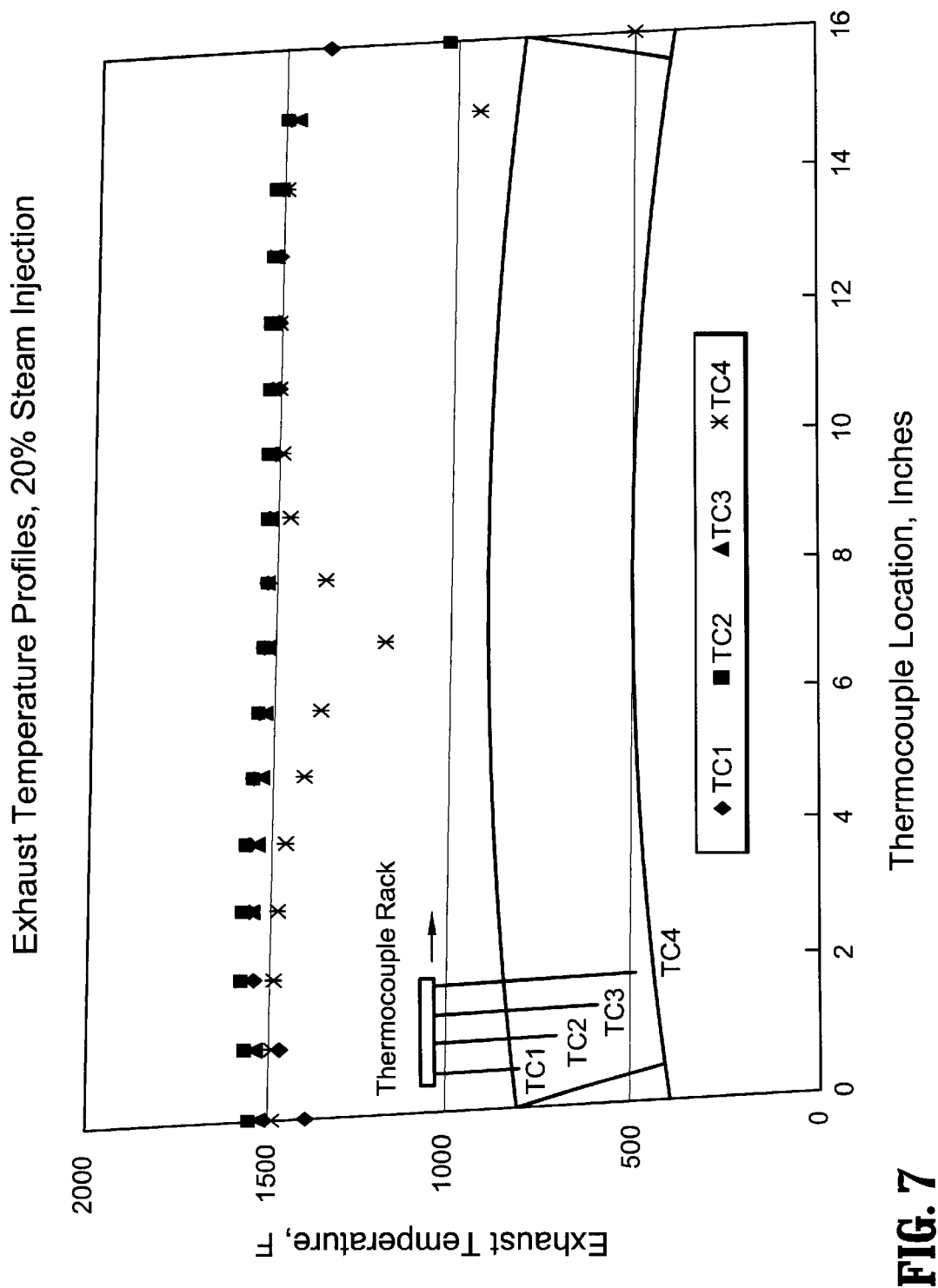
FIG. 7 illustrates an example of the temperature profile of exhaust with a 20% steam injection.

FIG. 6 illustrates an example of the temperature profile of the exhaust without a steam injection. FIG. 7 illustrates an example of the temperature profile of the exhaust with a 20% steam injection, according to an embodiment. A comparison of the two figures shows that the plot of FIG. 7, with the steam injection, has a much more uniform temperature profile than the plot of FIG. 6. FIG. 7 also has a lower exhaust temperature, and the plotted points are less scattered than those of FIG. 6, illustrating the increased performance of the gas turbine with a steam injection.

Figure 8:
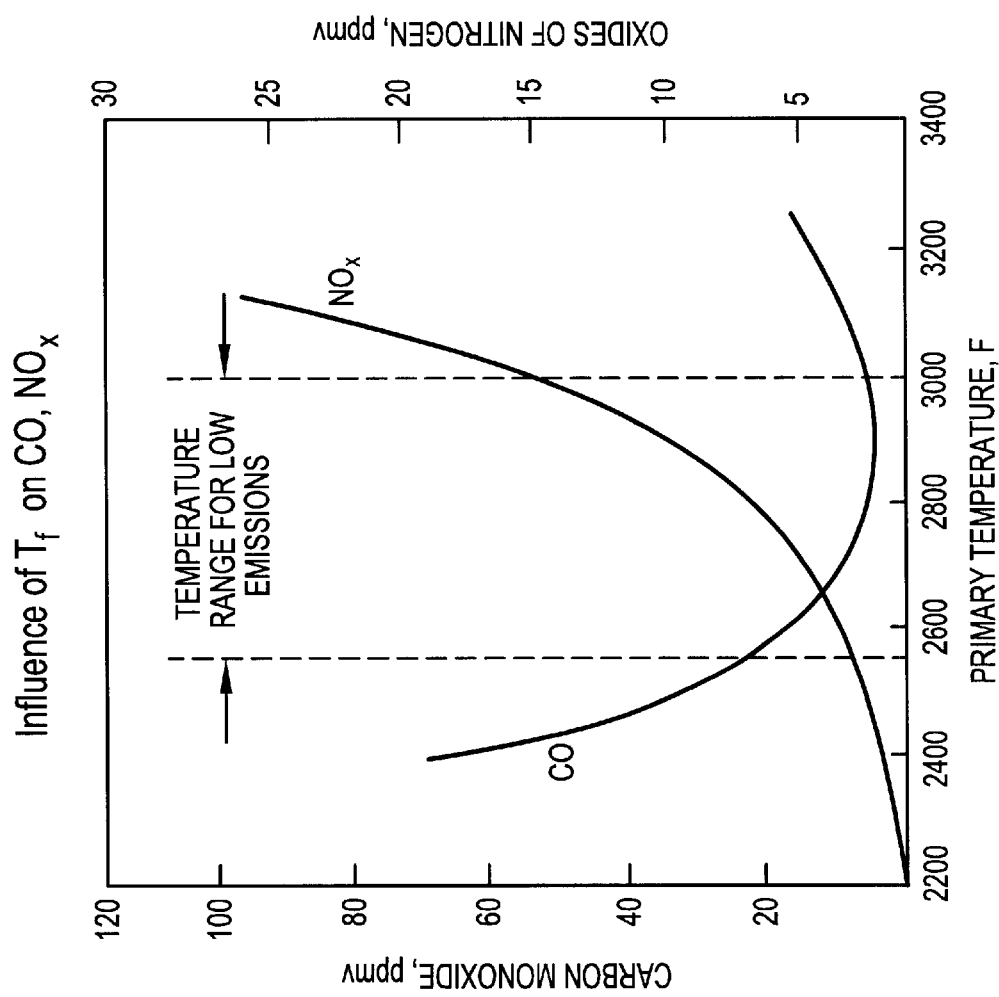
FIG. 8 illustrations a plot of $NO_x$ reduction vs. flame temperature.

FIG. 8 illustrates a plot of the concentrations of CO and $NO_x$ vs. the flame temperature in degrees Fahrenheit. As seen from the figure, the production of $NO_x$ emissions is quite dependent on the flame temperature. The production of CO also starts at a minimum level around 2850° Fahrenheit. When it reaches temperatures that are both higher and lower than those in its temperature range, the concentration of CO increases. Therefore, the steam injection design should be carefully chosen to preserve a stoicheometric flame envelope temperature at any point between 2600° and 2850° Fahrenheit with certain fuels. This temperature range may change depending on the fuel that is used.

Figure 9:
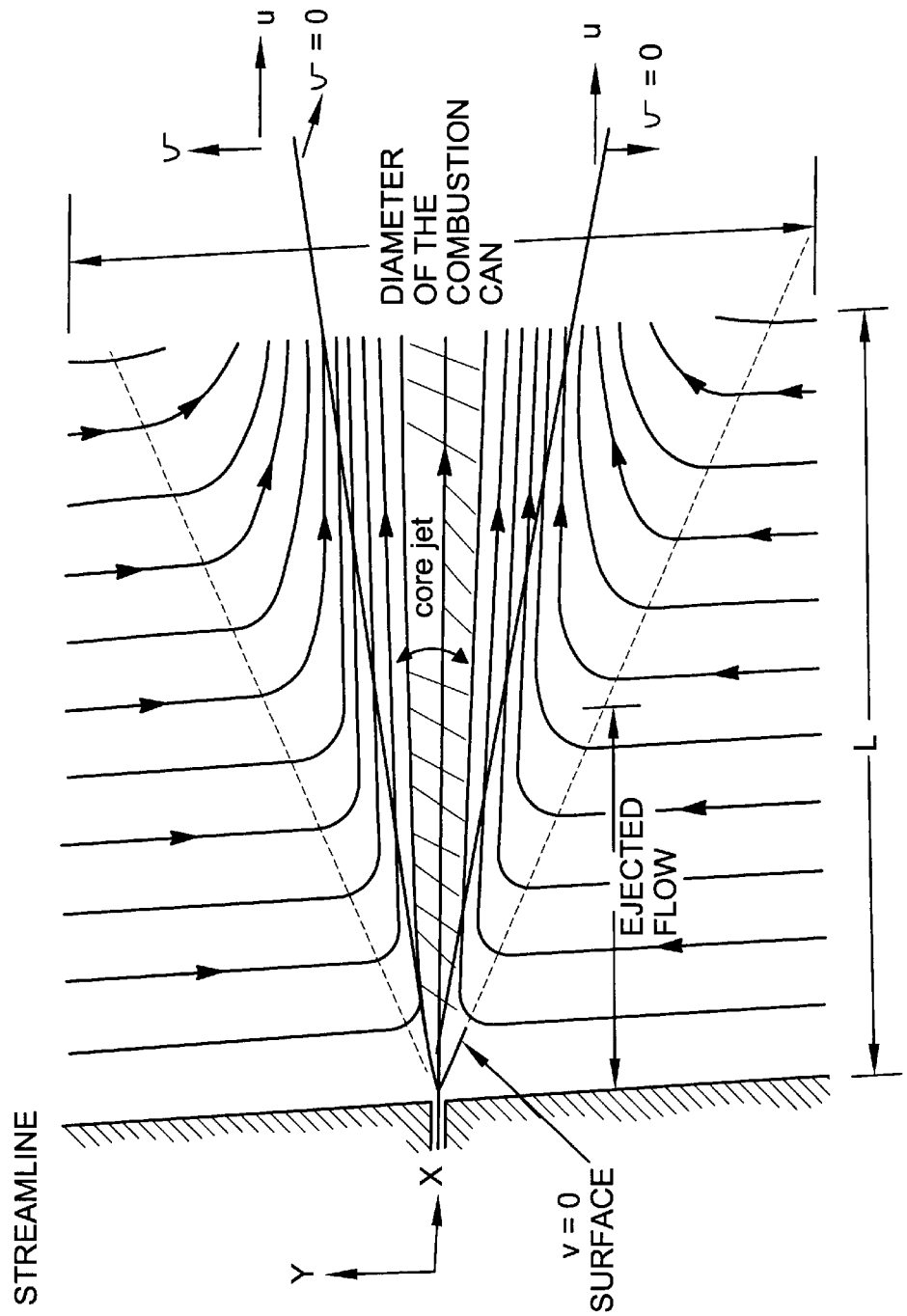
FIG. 9 illustrates the similarity flow streamline of a jet and its ejection profiles.

FIG. 9 illustrates the streamline profile of a turbulent jet. This profile also represents a similarity profile that can be calculated mathematically and verified experimentally. The similarity streamline profile is defined as sets of geometrical streamlines. Its physical location and shape are independent of the intensity of the jet. The jet velocity and the amount of outside mass drawn into the jet increase proportionally to each other, and the jet ratio is a constant. The jet velocity and the amount of outside mass drawn into the jet also decrease proportionally to each other. When this happens, the geometrical shape remains a constant as a result of the conservation of momentum of the jet. As the momentum transport of the jet moves towards the outside materials, the streamline of the jet expands due to the reduction of its momentum or velocity. At the same time, the streamline must maintain the continuity equations and conditions.

The viscosity of the fluids drags the inward flow component of the outside mass. When the expanding streamline in the center and the incoming component of the outside mass flow cancel each other in magnitude, a zero radial velocity component surface is formed. The cylindrical cone for regular gaseous flow is usually at a 15-degree solid angle. This property allows use of the similarity geometrical profile to design the steam injection nozzle of the disclosure herein. As can be seen, there is a region in which only vertical velocity exists for the incoming flows. Because the center core contains the jet material, the intersection of any streamline can be traced through a hole and back to the ratio of jet materials to outside material. The design of the disclosure herein takes advantage of this property; it is desirable that the steam injection provides momentum to drag the air through the dilution hole of the combustion liner so that the amount of airflow through the hole is approximately a constant, substantially independent of the amount of injected steam for the range of interest. The range of interest of steam of the system and method disclosed herein is preferably up to approximately 35% of the air flow.

As can be seen from FIG. 9, when the velocity is slowed down in the axial direction, streamlines of the steam in the center widen radially, which creates a radial velocity component outward from the centerline of the jet. In the meantime, the surrounding gas is being induced into the jet flow, which has a radial velocity component inward. Based on the foregoing, it is seen that the radial velocity v must approach zero somewhere. Because the velocity profiles are similar, a surface exists at which the radial velocity is equal to zero. This surface is dependent on the fluid's properties, but not on the amount of steam being injected within the range of interest.

As demonstrated in FIG. 9, this phenomenon can further be used to ensure good mixing. Because the surface of v=0 will intercept the combustion can as shown in the figure, beyond that point the steam and the surrounding gas have to be well mixed. The length from the jet to where the intersect occurs is called the "characteristic length" for mixing. When the mixing length is shorter than the transition piece, good or perfect mixing is guaranteed before the working fluid enters the first nozzle bank.

The design achieves the following objectives. First, the air distribution through the combustion liner is substantially unchanged due to the steam injection range; the steam injection range can exceed the 9% flame stability range that is observed in prior art designs. Second, the steam injection will not create flame instability inside the combustion liner, which is an improvement over the concentric steam nozzle method. Third, the intensity of turbulence inside the combustion liner is increased to provide a more uniform mixing before the mixture exits through the transition piece of the combustion liner.

Figure 10:
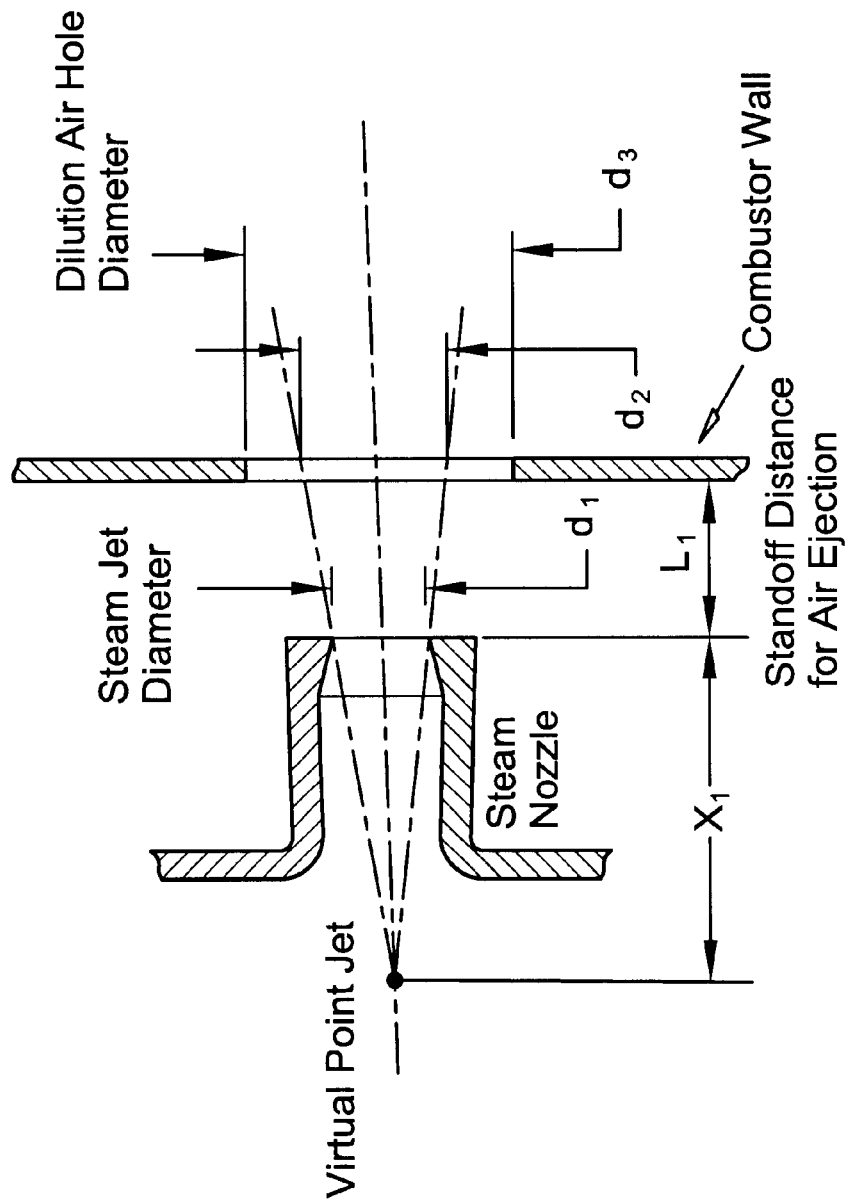
FIG. 10 illustrates a methodology used to design the steam injection nozzle for reverse flow combustors.

FIG. 10 is a diagram illustrating the result of using the similarity flow pattern to calculate the steam injection nozzle diameter with respect to the dilution hole diameter. In this calculation, the virtual point source is assumed to be inside the nozzle of the jet. It is assumed here that the similarity jet pattern exists. In FIG. 10, the steam jet nozzle diameter is referenced as d1, the dilution hole diameter is referenced as d3, and the jet intersecting the dilution hole has a diameter of d2. From the streamline calculation, the standoff distance L1 between the steam jet nozzle and the combustion liner can be determined so that the air previously flowing into the dilution hole now flows into the dilution hole at a higher velocity to compensate for the reduction in flow areas. From FIG. 2, it is seen that a combustion liner has many holes, these holes being necessary to maintain combustion stability. This design requires that the streamline pattern provide a uniform amount of airflow through the dilution hole regardless of the presence of the steam flow. Because this will not disturb the airflow through the other dilution holes, the combustion stability is preserved. The design accomplishes this objective because the steam has a much higher pressure than the compressor discharge air, thereby providing additional momentum to eject the air through individual dilution holes. Although the pressure drop increase is reduced, the high jet velocity and its momentum create higher turbulent agitation inside the combustion liner as a result of better turbulent mixing, as observed in the previous computer simulations.

Design

The steam injection system should be carefully designed and fabricated to assure low losses and proper mixing before entry to the turbine. Between the outlet of the HRSG boiler and the injection nozzles, the plumbing should be designed for low steam flow velocities and thus low pressure drops, and should be well insulated to reduce heat loss. The steam manifolds and injection nozzles should be designed to assure equalized steam distribution.

The design of the steam manifolds for direct injection into the combustion liner dilution holes should be carefully implemented. In the embodiment shown in FIG. 2, the line 50 carrying the superheated steam preferably should divide to supply steam to each combustor header or sub-manifold. Each header should then preferably supply four equally spaced injection tubes. Each combustor head cover is modified in this example by boring four holes therein to insert and secure the steam injection tubing. The location and configuration of the supply lines, manifold, and runners are selected to be compatible with existing features in the area of the combustors. Bellows expansion joints in the manifold system will avoid damage from thermal stresses.

The quality of the design and fabrication is important to achieving even steam flow distribution. Pressure and heat losses should be low and should be nearly equal up to each injection point. Accurate low-pressure-ratio nozzles are desired in each injection position. A slight variation in combustion liner pressure drop among the combustion cans can have a small effect on steam flow distribution. Uneven steam flow distribution can result in an increased turbine inlet temperature, thereby adversely affecting turbine part lives.

In a preferred embodiment, the steam injection hardware is not directly attached to the combustion liner. Therefore, the combustion liner and the transition piece remain unrestrained and free to expand as originally designed without additional stresses which can be caused by a direct attachment of the steam injection hardware. During periods that the engine is operated without steam injection, the nozzles are not exposed to the combustion gases; rather, they are shielded by the compressor discharge air flowing along the outside of the combustion liner. Under these conditions, their presence causes negligible flow restriction.

Based on the foregoing, an Advanced Cheng Cycle system requires the steam injection design to meet the following desired goals. First, the steam should have a uniform mixture downstream of the combustion can. Second, the steam injected into the combustion can should not disturb the combustion process upstream of the combustion can. Third, the steam injection should not create a backpressure burden on the compressor which would result in compressor stall conditions. Finally, the engine should be able to operate without the steam injection.

Design Example

The following description is an example of a preferred embodiment. The description is for illustration purposes only and this patent specification is not limited thereto.

In calculating the similarity solution of a turbulent jet, the velocity profile of turbulent jet mixing can be determined from the following equations, where u is the natural axial velocity profile, $\eta$ is the similarity variable, K is the jet strength, and $\epsilon_0$ is the apparent kinematic viscosity.

$$u = \frac{3}{8\pi} \frac{K}{\epsilon_0 x} \frac{1}{\left(1 + \frac{1}{4}\eta^2\right)^2} \quad (1)$$

$$v = \sqrt{\frac{3}{16\pi}} \frac{\sqrt{K}}{x} \frac{\eta - \frac{1}{4}\eta^3}{\left(1 + \frac{1}{4}\eta^2\right)^2} \quad (2)$$

$$\eta = \sqrt{\frac{3}{16\pi}} \frac{\sqrt{K}}{\epsilon_0} \frac{y}{x} \quad (3)$$

$$K = 2\pi \int_0^\infty u^2 y \, dy \quad (4)$$

In subsonic flow, $\epsilon_0/K$ was found to be constant; therefore, variation of jet momentum K does not change the geometrical pattern of the streamline with respect to y and x.

As was shown before, v=0 is considered to be the jet boundary because no steam will pass the v=0 surface. Solving equation (2) for $\eta$ at v=0, the similarity surface for the jet boundary is located at $\eta=2$. The velocity crossing the $\eta=2$ line has u component only and it is a measure of the induction mass. The empirical constant can be evaluated as:

$$\frac{\epsilon_0}{\sqrt{K}} = 0.0161,$$

Therefore, the divergence angle for the jet boundary using equation (3) becomes:

$$\alpha = \tan^{-1} \frac{y}{x} = 8\sqrt{\frac{\pi}{3}} \frac{\epsilon_0}{\sqrt{K}} = 7.5^\circ, \quad (5)$$

The volumetric flow of a circular jet can be calculated as:

$$Q(x) = 2\pi \int_0^\infty (ru) \, dr$$

Substituting r for y in $\eta$ gives:

$$Q(x) = 2\pi \int_0^\infty \frac{3}{8\pi}\left(\frac{K}{\epsilon_0 x}\right) \frac{r \, dr}{\left(1 + \frac{1}{4}\eta^2\right)^2}$$

And from equation (3):

$$\eta \, d\eta = \frac{1}{16} \frac{3}{\pi} \frac{K}{\epsilon_0^2 x^2} r \, dr$$

Therefore:

$$Q = 4\pi\epsilon_0 x \int_0^\infty \frac{1}{\left(1 + \frac{1}{4}\eta^2\right)^2} \eta \, d\eta = 0.404\sqrt{K} \, x \quad (8)$$

In designing the steam nozzles, the air flow $Q_{air}$ through the dilution holes should first be calculated using the pressure drop of the combustion can and the compressor air exit conditions. The steam nozzle diameter d1 and the standoff distance L1 (see FIG. 10) are calculated to match the maximum amount of steam flow while maintaining a constant amount of air flow into the dilution hole independent of the amount of steam within the range of interest.

To determine the proper steam nozzle orifice diameter, the similarity profile calculation is made by determining the nozzle diameter d1 needed to match the designed steam flow amount and the allowed pressure drop across the nozzle. Given the total temperature and pressure of the steam in the injection pipe, and the diameter of the injection pipe, the nozzle diameter d1 is obtained using the following methodology.

First, the total enthalpy H and total entropy S of the steam are determined from the ASME Steam Tables. For the total enthalpy H and the total pressure $P_{total}$, the steam Mach number is calculated at different static pressures. A correlation function has been found between the total pressure $P_{total}$, the steam Mach number M, and the static pressure $P_{static}$:

$$\frac{P_{total}}{P_{static}} = \left(1 + \frac{M^2}{1.305}\right)$$

The critical pressure ratio for these steam conditions is 0.5662 (note that $(\gamma+1)/2=1.146$ for steam at these conditions). If the pressure of the medium in which the steam nozzle discharges is less than the critical pressure, then the nozzle discharge plane pressure is set at the critical pressure (i.e., the steam nozzle is choked). Otherwise, the nozzle discharge plane pressure is set equal to the static pressure of the medium, which is the atmospheric pressure based on combustion tests.

Using the static pressure determined above, the static temperature is determined which would yield a static entropy equal to the total entropy Using the nozzle exit static pressure and temperature, the specific mass of the steam (p) as well as the static enthalpy h, are determined from the ASME Steam Tables. The speed of the steam at the nozzle exit is determined by the equation $V^2=2(H-h)$, and the nozzle exit area is determined by the equation $A_1=m_{st}/pV$.

A recursive calculation is required to determine the same quantities inside the pipe, upstream of the nozzle. In this case, the pipe area is known but the static pressure must be initially guessed. Then, the static pressure is re-calculated using the following relationship:

$$P_s \Rightarrow T_s(\text{from } S, P_s, \text{Steam Tables}) \Rightarrow \rho \Rightarrow u_s(\text{internal energy})$$
$$\Rightarrow V = \dot{m}_{st}(\rho A_v) \Rightarrow h_s = H - V^2/2 \Rightarrow ps = \rho(h_s - u_s)$$

The calculation is repeated until convergence is reached.

Knowing the dimensions of the steam nozzle orifice d1 and the strength of the jet, the similarity profile is introduced as illustrated in FIG. 8 to calculate the maximum entrained flow ($Q_2$) and thus the nozzle stand-off distance L1. The jet similarity solution is applied to match the ejected air through the dilution hole to the designed air flow rate. Detailed calculation procedures are performed as follows.

The distance of the nozzle orifice to the virtual origin of the steam jet is:

$$x_1 = \frac{d_1}{2} \cdot \frac{1}{\tan\alpha} \quad (9)$$

The steam jet momentum is:

$$K = 2\pi \int_0^\infty u^2 y\, dy = \frac{4}{\pi}\left(\frac{\dot{m}_{st}}{\rho_{st} d_1}\right)^2 \quad (10)$$

The similarity variable is calculated as follows:

$$\eta = \sqrt{\frac{3}{16\pi}} \frac{\sqrt{K}}{\varepsilon_0} \frac{y}{x} = 15.17 \frac{y}{x} \quad (11)$$

At the liner dilution hole, $y_2 = d_2/2$, and therefore:

$$\eta_2 = 7.585 \frac{d_2}{x_2} \quad (12)$$

According to equation (8), the maximum entrained volumetric flow rate (air and steam) through the liner dilution hole is:

$$Q_2 = 4\pi\varepsilon_0 x_2 \int_0^{\eta_2} \frac{\eta}{\left(1+\frac{1}{4}\eta^2\right)^2} d\eta = 8\pi\varepsilon_0 x_2 \frac{\eta_2^2}{4+\eta_2^2}$$

Substituting $72_2$ for $X_2$ yields:

$$Q_2 = C \frac{\eta}{4+\eta^2}, \quad (13)$$

where, $C = 8\pi\varepsilon_o \cdot (7.585 d_2)$

Since:

$$Q_2 = Q_{air} Q_{st} \quad (14)$$

Therefore, the following equation can be solved to obtain value of $\eta_2$, $$(Q_{air} - Q_{st})\eta_2^2 C\eta_2 + 4(Q_{air} + Q_{st}) = 0 \quad (15)$$

The steam nozzle stand-off distance is:

$$l = \frac{7.858 d_2}{\eta_2} - x_1 \quad (16)$$

The mixing length inside the combustion can should be calculated to take into account the cross flow inside the combustion can and the transition piece. Because the last row of holes on the combustion can is used for steam injection, only the transition piece velocity need be factored in. Assuming the velocity in the transition piece is approximately 50 ft/sec, the mixing length L is the length for the jet boundary layer to reach half the diameter of the transition piece. Because the length is shorter for jet impingement of four jets and because of the mild S-shaped turn of the transition piece, more mixing is promoted to further assure proper blending of the streams. The calculated result of the mixing length (without impingement) is on the order of 15 inches, for example.

Therefore, with the design as described above, the steam is injected into the dilution holes in such a way that the steam will entrain the dilution air. By suitably sizing the steam jet dimensions, the momentum of the steam jet will maintain a constant amount of air flow through the dilution holes, regardless of the amount of steam flow within the range of interest.

The disclosure herein therefore teaches to design the steam injection nozzles to inject steam through existing dilution holes. The nozzles are designed so that the amount of dilution air entering each dilution hole will not change with the various amounts of steam being injected. In other words, the distribution of combustion air going through the primary and secondary zones remains approximately constant when steam is injected that is in the range of 0–35% of the air flowing through the dilution holes. The design is based the "similarity flow" method as used in jet ejector flow.

Methods of Operation

Recent tests experimentally explored the designs of the streamline and the jet nozzle, using a gas turbine reverse flow combustion liner, an example of which is illustrated in FIG. 2. Although compressed air was used to simulate the gas turbine compressor air, it was calculated to scale into ambient atmospheric conditions. The tests used three different steam jet nozzle diameters. Results showed that a jet with a smaller diameter will create a higher steam velocity for the steam mass flow but will not provide mixing as good as the nozzle designed for its respective size. The nozzle with the larger diameter provided the best mixing effects, but did not provide the desired ejection effect, as some of the steam was deflected in the liner space and went to another area of the combustion liner. This experiment also varied the air, steam, and combustion fuel flow rates. The proper fuel flow rate was chosen to maintain the combustion chamber temperature at the rated gas turbine inlet temperature. Steam injections of up to 35% of the total airflow were tested, showing no adverse effect on flame stability. Thermocouples were attached to the metal transition piece and to the combustion liners, and they showed no hot spots or high metal temperatures. Turbulent mixing and a special steam-injected fuel nozzle both reduced $NO_x$ emissions to a level below 10 ppm, and the steam injection created a more turbulent flow, reducing the accompanying CO productions. These results demonstrate that this methodology can far exceed the 9% flame stability rate described in the Background section of this disclosure.

Ramifications of the Disclosure Herein

The disclosure herein teaches to convert existing reverse flow combustion chambers, popular with large industrial gas turbines, into steam injected systems. The conversion is simple and essentially involves the penetration of steam injection piping through the back plate of the combustion chamber in the space between the combustion liner and the outside wrapper. The steam injection system taught by the disclosure herein need not interfere with gas turbine operations when no steam is available or being generated. Further, the throttling of the steam flow will not substantially change the air distribution of the combustion liner design, thus preserving the combustion stability of the liner through its power range. The design of the disclosure herein also teaches to plumb a cooling steam line in the manner shown in FIG. 2, so that steam cooling is provided directly to the slots on top of a first stage nozzle after being properly mixed through a large nozzle design. Injecting the steam into the combustion liner effectively cools the first stage nozzle without causing the metal temperature to rise. Still further, the design of the disclosure herein reduces the production of $NO_x$ and its accompanying CO emissions. The teachings of the disclosure herein make the conversion of the gas turbine relatively easy and inexpensive, provide flexibility in operations, and are simple to implement.

The above specific embodiments are illustrative, and a person skilled in the art can introduce many variations on these embodiments without departing from the spirit of the disclosure or from the scope of the appended claims. For example, elements and/or features of different illustrative embodiments may be combined with each other and/or substituted for each other within the scope of this disclosure and appended claims. The embodiments are presented for the purpose of illustration only and should not be read as limiting the claimed invention or its application. Therefore, the claims should be interpreted commensurate with the spirit and scope of the disclosure and its variations.

What is claimed is:

1. A steam injection nozzle system for injecting steam into a combustion liner of a gas turbine for enhancing power output and efficiency of the gas turbine, said combustion liner having a plurality of dilution holes for supplying air to a combustion chamber to create turbulence, the steam injection nozzle system comprising:
    a steam manifold surrounding said combustion liner and having a plurality of steam injection nozzles, each steam injection nozzle being disposed opposite a corresponding dilution hole for injecting steam directly into said combustion liner through said dilution holes,
    wherein each steam injection nozzles is at a stand-off distance from a corresponding dilution hole and the steam injection nozzles and dilution holes have diameters and said diameters and said stand-off distance are selected such that the steam is injected without altering an existing amount of air through the plurality of dilution holes, resulting in a constant amount of air through the plurality of dilution holes independent of an amount of steam injected therein within a predetermined range of steam.

2. The steam injection nozzle system as set forth in claim 1, wherein the predetermined range of steam injected is between approximately 9% and approximately 35%, inclusive, of the air flowing through said combustion liner.

3. The steam injection nozzle system as set forth in claim 1, wherein the predetermined range of steam injected is less than or equal to approximately 35% of the air flowing through said combustion liner.

4. The steam injection nozzle system as set forth in claim 1, wherein each steam injection nozzle disposed opposite a corresponding dilution hole is shaped and operated to eject a steam jet within a solid angle of 15°.

5. The steam injection nozzle system as set forth in claim 1 in which said injection nozzles are arrayed to inject little or no steam into a primary combustion zone in said combustion chamber.

6. The steam injection nozzle system as set forth in claim 1 in which said injection increases turbulence in said combustion chamber and reduces CO production.

7. The steam injection nozzle system as set forth in claim 1 in which said combustion chamber is a reverse flow combustion chamber converted to said steam injection nozzle system.

8. A method for injecting steam into a combustion liner of a gas turbine for enhancing power output and efficiency of the gas turbine, said combustion liner having a plurality of dilution holes for supplying air to a combustion chamber to create turbulence, the method comprising the step of:
    injecting steam directly into said combustion liner through said dilution holes from a plurality of steam injection nozzles of a steam manifold surrounding said combustion liner, each steam injection nozzle being disposed opposite a corresponding dilution hole;
    wherein the injecting step does not alter an existing amount of air through the plurality of distribution holes, resulting in a constant amount of air through the plurality of dilution holes independent of an amount of steam injected therein within a predetermined range of steam.

9. The method as set forth in claim 8, wherein the predetermined range of steam injected is between approximately 9% and approximately 35%, inclusive, of the air flowing through said combustion liner.

10. The method as set forth in claim 8, wherein the predetermined range of steam injected is less than or equal to approximately 35% of the air flowing through said combustion liner.

11. The method as set forth in claim 8, further comprising the step of disposing each steam injection nozzle opposite a corresponding dilution hole such that each steam nozzle is not in contact with said combustion liner.

12. The method of claim 8 in which said injecting comprises injecting little or no steam into a primary combustion zone in said combustion chamber.

13. The method of claim 8 in which said injecting increases turbulence in said combustion chamber and reduces CO production.

14. The method of claim 8 in which said combustion chamber is a reverse flow combustion chamber converted to said steam injection nozzle system.

15. The method of claim 8 in which said injecting comprises injecting a steam jet within a solid angle of 15°.

16. A gas turbine, comprising:
    a compressor compressing inlet air;
    a combustion chamber receiving the compressed inlet air;
    a combustion liner lining said combustion chamber, having a plurality of dilution holes for supplying air to said combustion chamber to create turbulence and having a plurality of cooling holes disposed along an outside wall of said combustion liner for cooling said combustion liner;
    a steam manifold surrounding said combustion liner;
    a plurality of steam injection nozzles protruding from said steam manifold, each steam injection nozzle being disposed opposite a corresponding dilution hole for injecting steam directly into said combustion liner through said dilution holes, wherein the steam is injected without altering an existing amount of air through the plurality of dilution holes, resulting in a constant amount of air through the plurality of dilution holes independent of an amount of steam injected therein within a predetermined range of steam;
    wherein each injection nozzle is at a stand-off distance from a corresponding dilution hole, and said injection nozzles and dilution hole have diameters and said diameters and said stand-off distances are selected to maintain said constant amount of air independent of said amount of steam injected; and a turbine for receiving hot products of combustion from the combustion chamber.

17. The gas turbine as set forth in claim 16, wherein the steam injected is between approximately 9% and approximately 35%, inclusive, of the air flowing through said combustion liner.

18. The gas turbine as set forth in claim 16, wherein the steam injected is less than or equal to approximately 35% of the air flowing through said combustion liner.

19. The gas turbine as set forth in claim 16, wherein each steam injection nozzle disposed opposite a corresponding dilution hole is shaped and operated to eject a steam jet within a solid angle of 15°.

20. The gas turbine of 16 in which said injection nozzles are arrayed to inject little or no steam into a primary combustion zone in said combustion chamber.

21. The gas turbine of claim 16 in which said injection increases turbulence in said combustion chamber and reduces CO production.

22. The gas turbine of claim 16 in which said combustion chamber is a reverse flow combustion chamber converted to said steam injection nozzle system.

* * * * *